June 4, 1957 G. ENGELAGE ET AL 2,794,520
SPRING MECHANISM FOR CAMERA
Filed Jan. 25, 1955
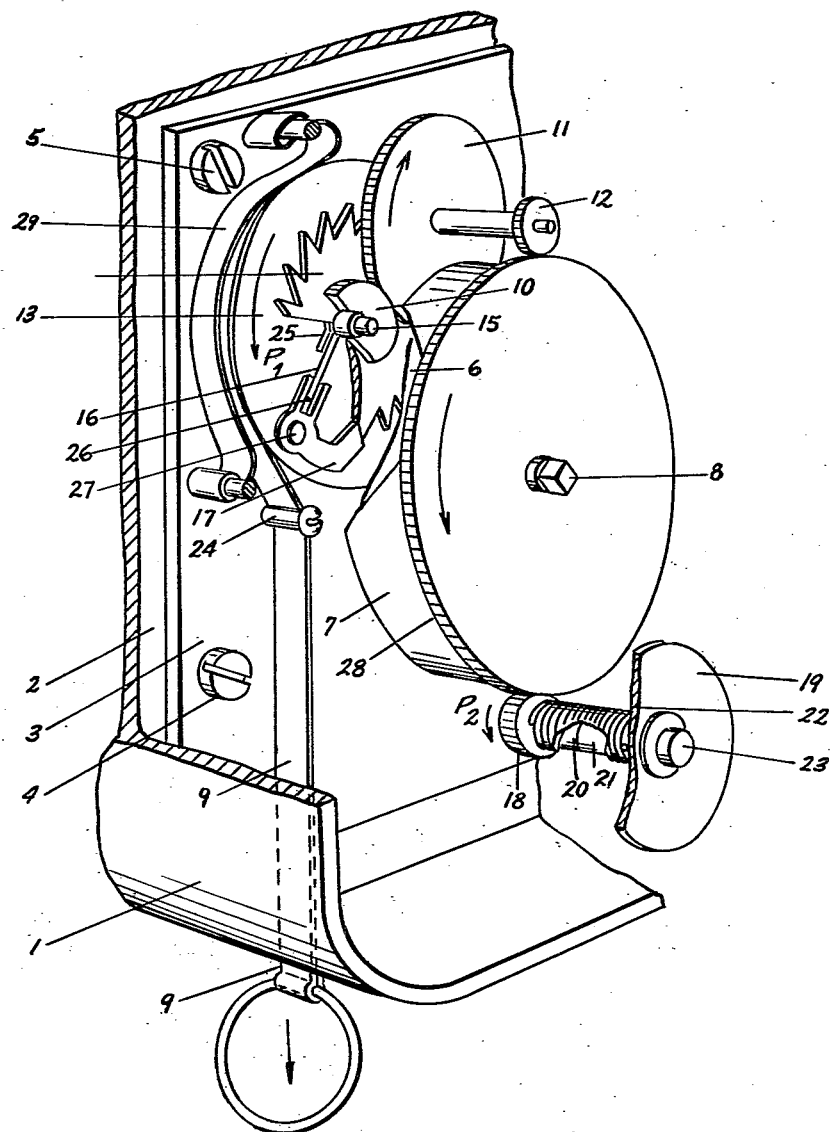
INVENTORS
GUNTHER ENGELAGE
LUDWIG PADBERG
BY
ATTORNEYS

United States Patent Office 2,794,520
Patented June 4, 1957

2,794,520

SPRING MECHANISM FOR CAMERA

Günther Engelage, Langel, near Holn, and Ludwig Padberg, Koln-Klettenberg, Germany, assignors, by mesne assignments, to Regula-King K. G., Bad Liebenzell, Germany, a corporation of Germany Application January 25, 1955, Serial No. 484,031

2 Claims. (Cl. 185—39)

This invention relates to a film camera, preferably a narrow film camera and more particularly to the spring mechanism operating such a camera.

The use of spring mechanism for film cameras, in particular for narrow film cameras, such as 8 millimeter narrow film cameras, is well known in the art. Such spring mechanisms, however, show definite disadvantages since their operating springs have to be tightened by means of keys, toggles or cranks. Thus, time losses occur as well as jerky vibrations of the camera, while the spring is being tightened. Because of these disadvantages the operator was forced to repeatedly interrupt his work for the purpose of tightening the operating spring.

Further, such means used for tightening the winding axle produced considerable noise and by the additionally occurring friction increases the winding force in an undesirable manner.

Furthermore, spring mechanism for operating narrow film cameras are known in which the transmission gear was a worm gear. Such gears require a very large and strong operating spring and are the cause of many disturbances. The operating spring likewise constitutes a source of error because of the excessive stress to which it is exposed.

The main object of this invention is an improvement in film cameras, particularly the operating spring mechanism and their operation.

It is a further object of the invention to remove the sources of error and ensure faultless operation of the spring mechanism.

A further object of the invention is the reduction of the force required for the winding operation and the elimination of reeling noises.

These and other objects of our invention will become more apparent when taken in connection with the drawing in which a front view of the novel spring mechanism of the invention is shown.

In the film camera 1 a partition 2 is provided to which is fastened a spring mechanism with the plate 3 by means of screws 4 and 5. The operating spring 6 encased in the spring cylinder 7 is attached by usual means to the stationary axis 8 and secured on the inside of the cylinder. According to the invention a drawband 9 in connection with a power transmission gear consisting of sprockets 10, 11 and 12 serves to tighten the operating spring 6.

The drawband 9 reeling upon the special drum 13 may consist of a band, thread or wire, and the material for such band, thread or wire may be steel or a natural or synthetic woven material.

A silent locking gear controlling the power transmission and consisting of the slotted wheel 14, the hairpin spring 16 fastened upon the same stationary axis 15, and of the detent 17 constituted the connection between the drum 13 and the power transmission gear. The disengagement of the ratio transmission gear during the process of winding is accomplished by a spiral spring locking mechanism located on one axis 22 of said ratio transmission gear, such spring mechanism consisting of gear wheels 18 and 19 each with an attached hub 20 and 21 as well as a coil spring 22 coupling in accordance with the sense of rotation of coil spring 22. Both hubs 20 and 21 and hence also the gear wheels 18 and 19 are pivotable around the stationary axis 23.

Through this arrangement of the individual parts not only is the power transmitted by the drawband to the operating spring transmitted noiselessly and tensionally but additionally the reversal of the draw gear without ratching noise and moreover arresting the already tensed spring is made possible. Despite the continually increasing reeling force due to increasing spring tension, the power transmission gear, by means of a few light, fast pulls of the pulling mechanism, makes possible the complete tensioning of the operating spring and the readying of the spring mechanism for operation.

The operation of the spring mechanism hitherto described is as follows: a reeling force effective on the band 9 in the direction of the arrow unwinds the bands 9 from the take-up drum 13, guided by the roll 24. By fastening of the other end of the band on the band take-up drum 13, the latter is caused to rotate in the direction of the arrow $p_1$ around the stationary axis 15. A reverse spring in the drum 13 effective in the opposite direction of the winding power (not shown) is tightened when the band 9 unwinds. If the reverse spring is so designed that its power when it is wound up is larger than the weight of the entire film camera, the winding band may serve as a carrying handle without a special arresting device.

The hairpin spring 16 is so clamped onto the stationary axis 15, in its circumferential groove or notch 25, that because of the friction produced thereby a rotation on the axis is made difficult. The free end of the hairpin spring protrudes into the recess 26 of the detent 17, designed an angle lever, said detent being rotatably positioned around the pin 27. When the frame 13 is rotated, the pin 27 moves in the direction of the arrow $p_1$. The free end of the hair pin spring 16 clamped upon the stationary axis 15 impedes the lever of the detent 17 provided with the recess 26. The detent 17 therefore rests against the teeth of the slotted wheel 14 thus making a rigid connection between the reel-up drum 13 and the slotted wheel 14. The slotted wheel 14 is firmly connected with the cog wheel 10 and likewise pivotable around the stationary axis 15.

The power transmission gear consisting of sprockets 10, 11 and 12 forms the connection between the drawband with the silent locking gear and the spring cylinder 7. By this means the reeling force is made smaller by the ratio of the transmission than the force to be overcome of the tightening operating spring, as evidenced by the following example.

The force of the tensed operating spring 6 $P_{FA}$ measured on the toothed rim 28 of the cylinder 7 amounts to 16,000 g. Through the power transmission gear consisting of two transmission ratios $I_1$ and $I_2$, the reeling force is transmitted at the ratio $I_1.I_2$. The reeling force $F_A$ which by means of the pull band 9 operates on the circumference of the drum 13, is transmitted at the ratio $I_T$ of the radius of the drum 13 to the radius of the sprocket 10. Counteracting the winding force, the force of the reversing $P_R$ is 1000 g., measured on the circumference of the drum 13.

Thus we obtain the following equation:

$$P_A = P_{FA}.I_1.I_2.I_T + P_R$$

$$P_A = \frac{16000.1.1.1}{2.8.2} + 1000 \text{ g.}$$

$$P_A = 1500 \text{ g.}$$

During this winding motion of the drum 13 the spring cylinder 7 rotates, driven by the sprockets 10, 11 and 12 in the direction of the arrow and thereby reels the tensing operating spring 6 upon the stationary axis 8.

Since during this process the ordinary ratio transmission gear (not shown) must be disengaged, spring mechanism for operating narrow film cameras have hitherto been provided with a lever locking mechanism or a similar device, which, however, were not silent in the direction of reeling. According to the invention the spiral spring locking mechanism which is silent in both directions is positioned between the spring cylinder 7 and the ratio transmission gear. The spiral spring 22, with a slight pre-winding, is so mounted on the hubs 20 and 21 that in turning the gear wheel 18 and its hub 20 in the operating direction, $P_2$, the individual windings of the spiral spring 22 are contracted on the hubs 20 and 21 due to the pre-winding. This produces a rigid coupling of both hubs 20 and 21 and the corresponding gear wheels 18 and 19 in the operating direction of $P_2$. When turning the gear wheel 18 in the opposite reeling direction from $P_2$, no coupling of the hubs 20 and 21 will take place because the spiral spring 22 is somewhat untightened in that case.

When the winding motion is completed and hence the winding force unrolling the band 9 becomes =0, then the reverse spring starts to rotate the band reel-up drum 13 in the opposite direction. The free end of the hairpin spring 16 holds the handle of the detent 17 with the recess 26 and thus releases the detent 17 from the slotted wheel 14. By means of the reversing spring the band 9 is rolled upon the drum 13: thus the detent 17 by means of the hairpin spring 16 is kept outside the teeth of the slotted wheel 14.

The now tensed operating spring 6 has the tendency to start moving the drum 7 in the opposite direction of the arrow and to drive the gear wheel 18 through the toothed rim 28 of the drum 7 in the direction of the arrow $P_2$. This causes the coil spring 22 wound in this direction on the hub 20 to firmly tighten around the hubs 20 and 21 and constitutes a power-transmitting connection between the gear wheels 18 and 19.

To ensure a firm guidance of the reeling band 9 this runs over the roll 24 which is provided with a rim. Furthermore, the springy rail 29 prevents the band 9 from sliding off the drum 13. Simultaneously it brakes the movement of the drum 13 by the winding band 9, whereby any accidentally recoiling band is arrested without damage.

After several repetitions of the winding process the operating spring 6 is tensed and the spring mechanism, after releasing the ratio transmission gear by activation of the ordinary release knob of the camera can operate the film and the diaphragm of the narrow film camera.

In the foregoing, we have described our invention only in connection with preferred embodiments thereof. Many variations and modifications of the principles of our invention within the scope of the description herein are obvious. Accordingly, we prefer to be bound not by the specific disclosure herein but only by the appending claims.

We claim:

1. In a spring mechanism for operating narrow film cameras and including pull winding means, the combination of two silent coupling means, one of said coupling means being engageable with a spring power transmission gear and comprising a one-way clutch locking mechanism including a spiral spring engageable with a shaft during operation of the camera and disengageable therefrom when the winding means is pulled, the other of said coupling means comprising a silent ratchet device engageable with the drum for the pull winding means when the winding means is pulled and disengageable therefrom when the winding means is released.

2. In a spring mechanism for operating narrow film cameras and including pull winding means, the combination of two silent coupling means, one of said coupling means being engageable with a spring power transmission gear and comprising a one-way clutch locking mechanism including a spiral spring engageable with a shaft during operation of the camera and disengageable therefrom when the winding means is pulled, the other of said coupling means comprising a silent ratchet device which includes a drum and slotted wheel mounted on a common pivot, said pivot also carrying a circumferential notch, a hairpin spring frictionally clamped around the axis of said pivot within said notch at its bow end, the other end of said spring engaging a lever pivotally mounted on the said drum, said lever containing a detent which is turned toward the axis of the slotted wheel so as to be engageable with the slots thereof.

References Cited in the file of this patent

UNITED STATES PATENTS

| Number | Name | Date |
|---|---|---|
| 544,234 | Meyer | Aug. 6, 1895 |
| 675,669 | Norling | June 4, 1901 |
| 1,057,598 | Van Der Werff | Apr. 1, 1913 |
| 1,275,635 | Weaser | Aug. 13, 1918 |
| 1,503,787 | Folk | Aug. 5, 1924 |
| 1,554,105 | La Riviere | Sept. 15, 1925 |
| 1,739,113 | Azarraga | Dec. 10, 1929 |
| 2,168,998 | Lindenberg | Aug. 8, 1939 |
| 2,461,784 | Streed | Feb. 15, 1949 |